(12) United States Patent
Cornejo et al.

(10) Patent No.: US 8,539,794 B2
(45) Date of Patent: *Sep. 24, 2013

(54) STRENGTHENED GLASS SUBSTRATE SHEETS AND METHODS FOR FABRICATING GLASS PANELS FROM GLASS SUBSTRATE SHEETS

(75) Inventors: Ivan A Cornejo, Corning, NY (US); Sinue Gomez, Corning, NY (US); Lisa Anne Moore, Corning, NY (US); Sergio Tsuda, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 317 days.

This patent is subject to a terminal disclaimer.

(21) Appl. No.: 13/018,904

(22) Filed: Feb. 1, 2011

(65) Prior Publication Data

US 2012/0196071 A1 Aug. 2, 2012

(51) Int. Cl.
*C03C 15/00* (2006.01)
*C03B 33/02* (2006.01)

(52) U.S. Cl.
USPC .......................................... 65/30.14; 65/105

(58) Field of Classification Search
USPC ................. 65/30.14, 61, 63–65, 105
See application file for complete search history.

(56) References Cited

U.S. PATENT DOCUMENTS

| | | | | |
|---|---|---|---|---|
| 3,615,322 A | * | 10/1971 | Bogart et al. | 65/30.14 |
| 3,843,472 A | * | 10/1974 | Toussaint et al. | 428/192 |
| 4,023,945 A | * | 5/1977 | Boaz | 65/112 |
| 4,416,930 A | * | 11/1983 | Kelly | 428/137 |
| 4,468,534 A | | 8/1984 | Boddicker | |
| 4,702,042 A | | 10/1987 | Herrington et al. | |
| 4,824,712 A | * | 4/1989 | Falleroni et al. | 428/137 |
| 5,733,622 A | * | 3/1998 | Starcke et al. | 428/64.1 |
| 5,780,371 A | | 7/1998 | Rifqi et al. | |
| 6,845,635 B2 | * | 1/2005 | Watanabe et al. | 65/30.14 |
| 6,990,285 B2 | | 1/2006 | Schroeder et al. | |
| 7,197,897 B2 | * | 4/2007 | Jacobson et al. | 65/30.14 |
| 8,393,175 B2 | * | 3/2013 | Kohli et al. | 65/30.14 |
| 2005/0221044 A1 | | 10/2005 | Gaume et al. | |
| 2008/0128953 A1 | | 6/2008 | Nagai et al. | |
| 2010/0279067 A1 | * | 11/2010 | Sabia et al. | 428/141 |
| 2010/0291353 A1 | | 11/2010 | Dejneka et al. | |
| 2011/0003619 A1 | * | 1/2011 | Fujii | 455/566 |

(Continued)

FOREIGN PATENT DOCUMENTS

| | | |
|---|---|---|
| GB | 1222182 A | 1/1968 |
| JP | 2004083378 A | 3/2004 |

(Continued)

*Primary Examiner* — Jason L Lazorcik
(74) *Attorney, Agent, or Firm* — Robert P. Santandrea

(57) ABSTRACT

Strengthened glass substrate sheets and methods of fabricating glass panels from glass substrate sheets are disclosed. In one embodiment, a method includes forming at least one series of holes through a thickness of the glass substrate sheet, wherein the at least one series of holes defines a perimeter of the glass panel to be separated from the glass substrate sheet. The method further includes strengthening the glass substrate sheet by a strengthening process, and separating the glass panel from the glass substrate sheet along the at least one series of holes. At least a portion of one or more edges of the glass panel has an associated edge compressive layer. In another embodiment, a strengthened glass substrate sheet includes at least one series of holes that defines a perimeter of one or more glass panels to be separated from the strengthened glass substrate sheet.

16 Claims, 5 Drawing Sheets

(56) References Cited

U.S. PATENT DOCUMENTS

| | | | |
|---|---|---|---|
| 2012/0048604 A1* | 3/2012 | Cornejo et al. | 174/258 |
| 2012/0052252 A1* | 3/2012 | Kohli et al. | 428/174 |
| 2012/0135177 A1* | 5/2012 | Cornejo et al. | 428/43 |
| 2012/0196071 A1* | 8/2012 | Cornejo et al. | 428/43 |
| 2012/0214004 A1* | 8/2012 | Hashimoto et al. | 428/428 |
| 2013/0034688 A1* | 2/2013 | Koike et al. | 428/134 |

FOREIGN PATENT DOCUMENTS

| | | |
|---|---|---|
| JP | 2004352535 A | 12/2004 |
| JP | 2008007360 A | 1/2008 |
| JP | 2008007384 A | 1/2008 |
| JP | 2008247732 A1 | 10/2008 |
| KR | 101022591 B1 | 3/2011 |

* cited by examiner

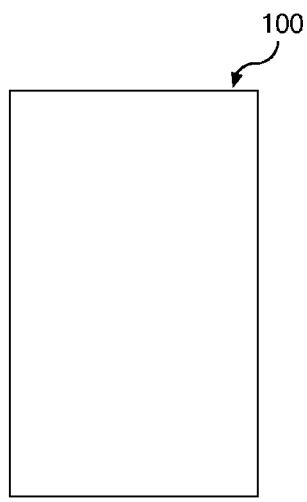
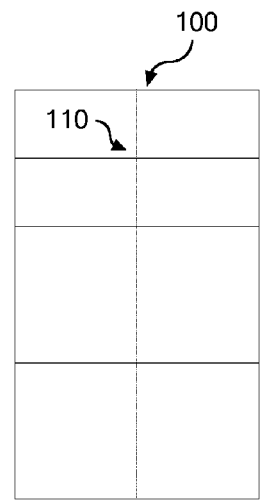
FIG. 5A     FIG. 5B
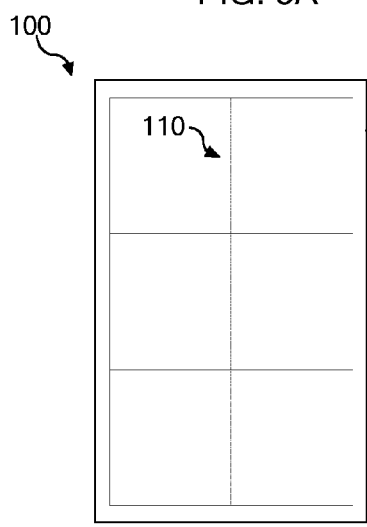
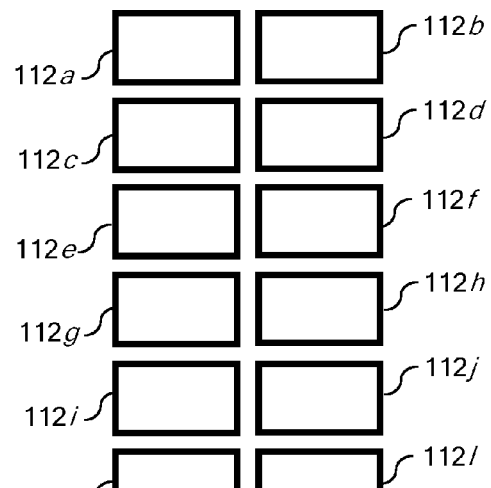
FIG. 5C     FIG. 5E
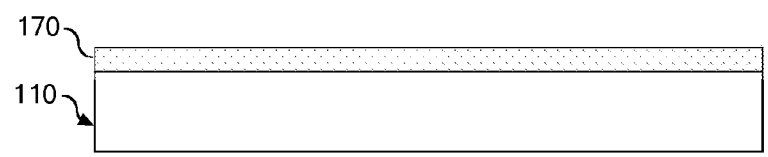
FIG. 5D

STRENGTHENED GLASS SUBSTRATE SHEETS AND METHODS FOR FABRICATING GLASS PANELS FROM GLASS SUBSTRATE SHEETS

BACKGROUND

1. Field

The present specification generally relates to methods for separating strengthened glass substrate sheets and, more particularly, to strengthened glass substrate sheets and methods of fabricating glass panels from strengthened glass substrate sheets by forming at least one series of holes in a glass substrate sheet prior to a strengthening process.

2. Technical Background

Thin glass panels have a variety of applications in consumer electronic devices. For example, such glass panels may be used as cover sheets and/or touch screens for LCD and LED displays incorporated in mobile telephones, GPS devices, display devices such as televisions and computer monitors, and various other electronic devices. As the use of glass panels continues to expand, the geometric complexity of the glass panels also increases. For example, certain applications may require that the glass panels be formed with complex shapes, such as curved peripheries and/or through-features, thus requiring additional machining operations to achieve the desired geometry.

The glass panels may be formed by separating a glass substrate sheet into a plurality of discrete glass panels. The glass substrate sheet may be formed from damage resistant glass, such as ion-exchanged glass or similarly strengthened glass. For example, the ion-exchange process creates a compressive stress at the surfaces of the glass substrate. These compressive stresses extend beneath the surface of the glass substrate to a certain depth, referred to as the depth of layer. The compressive stresses are balanced by a layer that is under tensile stresses (referred to as central tension) such that the net stress in the glass substrate is zero. The formation of compressive stresses at the surface of the glass substrate makes the glass strong and resistant to mechanical damage and, as such, mitigates catastrophic failure of the glass substrate for flaws which do not extend through the depth of layer.

When glass panels are ion exchanged after separation, both the surface and edges are strengthened and damage resistant. However, there is the case where it is desirable to separate the glass sheet into individual panels after the ion exchange process. In this case, the newly formed edges have not been ion exchanged and are susceptible to damage from mechanical contact. More specifically, separating the glass substrate after ion-exchange processing leaves the central tension layer exposed at the edges of the glass panel, thereby leaving the edge susceptible to damage which may lead to failure.

SUMMARY

In one embodiment, a method of fabricating a glass panel from a glass substrate sheet includes forming at least one series of holes through a thickness of the glass substrate sheet, wherein the at least one series of holes defines at least a portion of a perimeter of the glass panel to be separated from the glass substrate sheet. The method further includes strengthening the glass substrate sheet by a strengthening process, and separating the glass panel from the glass substrate sheet along the at least one series of holes. At least a portion of one or more edges of the glass panel has an associated edge compressive layer.

In another embodiment, a method of fabricating a strengthened glass touch panel includes forming at least one series of holes through a thickness of a glass substrate sheet, wherein the at least one series of holes defines at least a portion of a perimeter of the strengthened glass touch panel to be separated from the glass substrate sheet. The method further includes strengthening the glass substrate sheet by an ion-exchange strengthening process, applying a film layer to a surface of the glass substrate sheet after the strengthening process, separating the strengthened glass touch panel from the strengthened glass substrate sheet along the at least one series of holes, and applying an edge-finishing material to at least one edge of the strengthened glass touch panel. The film layer is configured to provide touch-screen functionality to the strengthened glass touch panel. At least a portion of one or more edges of the strengthened glass touch panel has an edge compressive stress layer, and the strengthened glass touch panel has a horizontal bend strength within a range of about 200 MPa to about 1000 MPa, and a vertical bend strength within a range of about 100 MPa to about 600 MPa.

In yet another embodiment, a strengthened glass substrate sheet includes an ion-exchanged glass and at least one series of holes extending through a thickness of the ion-exchanged glass. The ion-exchanged glass further includes a first strengthened surface layer of a first surface and a second strengthened surface layer of a second surface under a compressive stress and extending from the first and second surfaces to a depth of layer, and a central region between the first strengthened surface layer and the second strengthened surface layer that is under tensile stress. The at least one series of holes defines at least a portion of a perimeter of a glass panel to be separated from the strengthened glass substrate sheet. The ion-exchanged glass further includes a radially-extending compressive stress region at each individual hole of the at least one series of holes such that the radially-extending compressive stress region is positioned between the first strengthened surface layer and the second strengthened surface layer and radially extends from a wall of each individual hole to a depth of layer. Individual holes of the at least one series of holes have a diameter within a range of about 50 μm to about 1 mm, and a spacing between adjacent individual holes of the at least one series of holes is about 100 μm to about 1 mm.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 5A schematically depicts a top view of a glass substrate sheet prior to a drilling process according to one or more embodiments described and illustrated herein;

FIG. 5B schematically depicts a top view of a drilled glass substrate sheet according to one or more embodiments described and illustrated herein;

FIG. 5C schematically depicts a drilled glass substrate sheet in an ion-exchange bath according to one or more embodiments described and illustrated herein;

FIG. 5D schematically depicts a side view of a glass substrate having one or more thin film layers deposited thereon according to one or more embodiments described and illustrated herein;

FIG. 5E schematically depicts a plurality of strengthened glass panels separated from a glass substrate sheet according to one or more embodiments described and illustrated herein;

DETAILED DESCRIPTION

Figure 1:
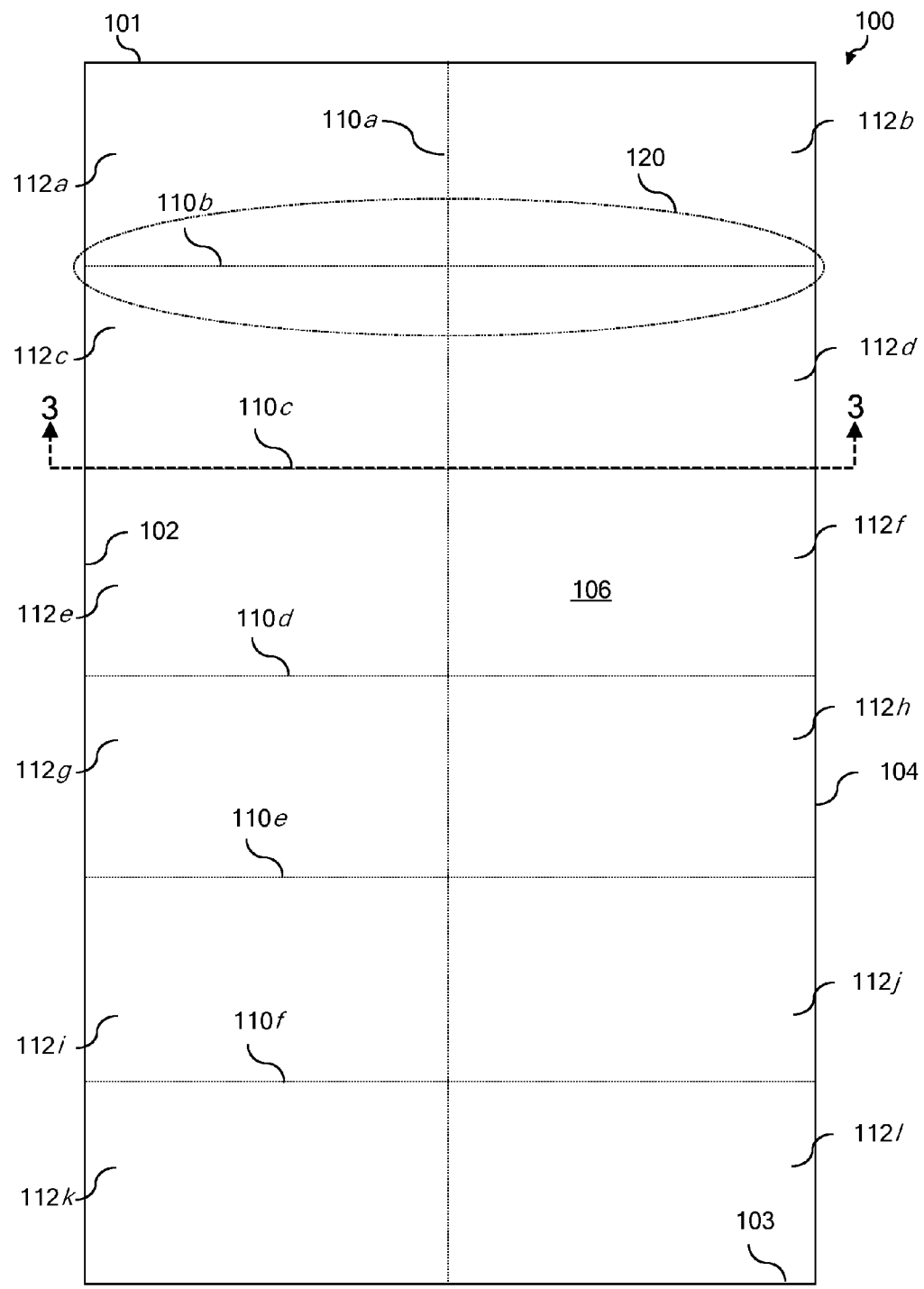
FIG. 1 schematically depicts a top view of a glass substrate sheet according to one or more embodiments described and illustrated herein.
Figure 4:
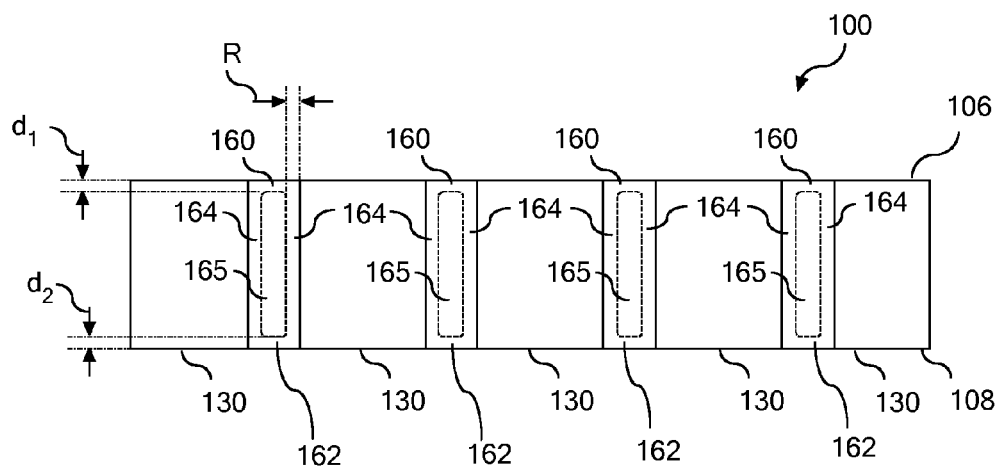
FIG. 4 schematically depicts a partial internal view of a glass substrate sheet according to one or more embodiments described and illustrated herein.

Reference will now be made in detail to various embodiments of glass substrate sheets and methods of separating glass panels from glass substrate sheets, examples of which are illustrated in the accompanying drawings. One embodiment of a glass substrate sheet is schematically depicted in FIG. 1. The glass substrate sheet generally comprises a sheet of strengthened glass (e.g., ion-exchanged glass). A series of holes extend through the thickness of the glass substrate sheet and define a perimeter of one or more glass panels that are to be separated from the glass substrate sheet during a separation process. As schematically shown in FIG. 4, the glass substrate sheet comprises a first layer of compressive stress that extends from a first surface of the glass substrate sheet to a depth of layer $d_1$, and a second layer of compressive stress that extends from the second surface of the glass substrate sheet to a depth of layer $d_2$. Radially-extending compressive stress regions are associated with each hole of the series of holes. The radially-extending compressive stress regions are positioned between the first and second layers of compressive stress and extend radially from each hole to a radius R. Glass substrate sheets and methods for fabricating glass panels from glass substrate sheets will be described in more detail herein with reference to the appended figures.

Referring now to FIG. 1, a glass substrate sheet 100 is schematically depicted according to one or more embodiments shown and described herein. The glass substrate sheet 100 is generally formed from a glass composition which may be strengthened, such as by ion-exchange processing or heat treating. For example, the glass substrate sheet 100 may be formed from soda-lime glass batch compositions, alkali aluminosilicate glass batch compositions, alkali aluminoborosilicate glass batch compositions or other glass batch compositions which may be strengthened by ion-exchange or other strengthening processes after formation.

As an example and not a limitation, the glass substrate sheet 100 is formed from GORILLA® glass produced by Corning, Inc. In some embodiments, the glass substrate sheet 100 described herein comprises an alkali aluminosilicate glass or an alkali aluminoborosilicate glass. In one embodiment, the alkali aluminosilicate glass comprises alumina, at least one alkali metal and, in some embodiments, greater than 50 mol %, $SiO_2$, in other embodiments, at least 58 mol %, and in still other embodiments, at least 60 mol % $SiO_2$, wherein the ratio $$\frac{Al_2O_3 \text{ (mol \%)} + B_2O_3 \text{ (mol \%)}}{\sum alkali \text{ metal modifiers (mol \%)}} > 1,$$

where the modifiers are alkali metal oxides. This glass, in particular embodiments, comprises, consists essentially of, or consists of: about 58 mol % to about 72 mol % $SiO_2$; about 9 mol % to about 17 mol % $Al_2O_3$; about 2 mol % to about 12 mol % $B_2O_3$; about 8 mol % to about 16 mol % $Na_2O$; and 0 mol % to about 4 mol % $K_2O$, wherein the ratio $$\frac{Al_2O_3 \text{ (mol \%)} + B_2O_3 \text{ (mol \%)}}{\sum alkali \text{ metal modifiers (mol \%)}} > 1,$$

where the modifiers are alkali metal oxides. In another embodiment, the alkali aluminosilicate glass comprises, consists essentially of, or consists of: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol % MgO; and 0 mol % to about 3 mol % CaO. In yet another embodiment, the alkali aluminosilicate glass comprises, consists essentially of, or consists of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol % ≤ $Li_2O+Na_2O+K_2O$ ≤ 20 mol % and 0 mol % ≤ MgO+CaO ≤ 10 mol %. In still another embodiment, the alkali aluminosilicate glass comprises, consists essentially of, or consists of: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about 5 mol % $K_2O$; about 4 mol % to about 6 mol % MgO; and 0 mol % to about 5 mol % CaO, wherein: 66 mol % ≤ $SiO_2+B_2O_3+CaO$ ≤ 69 mol %; $Na_2O+K_2O+B_2O_3+MgO+CaO+SrO$ > 10 mol %; 5 mol % ≤ MgO+CaO+SrO ≤ 8 mol %; $(Na_2O+B_2O_3)-Al_2O_3$ ≤ 2 mol %; 2 mol % ≤ $Na_2O-Al_2O_3$ ≤ 6 mol %; and 4 mol % ≤ (Na$_2$O+K$_2$O)−Al$_2$O$_3$ ≤ 10 mol %. In other embodiments, the glass substrate sheet 100 comprises SiO$_2$, Al$_2$O$_3$, P$_2$O$_5$, and at least one alkali metal oxide (R$_2$O), wherein 0.75 ≤ [(P$_2$O$_5$ (mol %)+R$_2$O (mol %))/M$_2$O$_3$ (mol %)] ≤ 1.2, where M$_2$O$_3$=Al$_2$O$_3$+B$_2$O$_3$.

In some embodiments, the glass is free of lithium; i.e. the glass comprises less than 1 mol % Li$_2$O and, in other embodiments, less that 0.1 mol % Li$_2$O. In some embodiments, such glasses are free of at least one of arsenic, antimony, and barium; i.e. the glass comprises less than 1 mol % and, in other embodiments, less that 0.1 mol % of As$_2$O$_3$, Sb$_2$O$_3$, and/or BaO. In some embodiments, the glass substrate sheet is down-drawn, using methods such as, but not limited to fusion-drawing, slot-drawing, re-drawing, and the like.

The glass substrate sheet 100 may be configured as a glass sheet of a glass composition that is to be separated into individual glass panels that may be incorporated into a wide variety of applications, such as television displays, smart phone displays, media player displays, etc. The glass substrate sheet 100 is generally planar with a first surface 106 and a second surface 108 positioned opposite to and parallel to the first surface 106 (see FIG. 3). The glass substrate sheet 100 may further comprise a first edge 101, a second edge 102, a third edge 103 and fourth edge 104. Embodiments may also comprise circular or arbitrarily shaped glass substrate sheets.

A thickness of the glass substrate sheet 100 depends on the particular application in which the glass panels are to be implemented. As an example and not a limitation, the thickness of the glass substrate sheet may be within a range of about 0.3 mm and about 1.5 mm. Other thicknesses are also possible. Further, the glass substrate sheet may come in a variety of sizes depending on the application and the number of glass panels to be separated. In one embodiment, the glass substrate sheet 100 has width of about 1100 mm and a length of about 1300 mm. It should be understood that the glass substrate sheet 100 may have other dimensions.

As shown in FIG. 1, the glass substrate sheet 100 comprises series of holes 110a-110f that define pre-separated glass panels 112a-112l that are to be separated from the glass substrate sheet 100. The series of holes 110a-110f define a perimeter of the pre-separated glass panels 112a-112f. In one embodiment, the series of holes fully define the perimeter of the pre-separated glass panels (i.e., each edge of the glass panel is defined by the series of holes). In another embodiment, the series of holes only partially define the perimeter of the pre-separated glass panels, wherein one or more of the edges of each glass panel is defined by the series of holes and one or more of the edges of each glass panel is defined by one or more edges of the glass substrate sheet, as shown in FIG. 1.

It is noted that, although the holes are illustrated as generally circular in cross section throughout the figures, the holes of the series of holes 110a-110f may be of any shape. For example, the holes may be elliptical, rectangular, triangular, square, etc.

As described below, the series of holes 110a-110f are formed within the glass substrate sheet 100 prior to the strengthening process such that the series of holes provided within the glass substrate sheet 100 are exposed to the strengthening process. The series of holes 110a-110f define perforated regions, and are located along lines of desired separation such that the glass substrate sheet 100 may be separated along the series of holes 110a-110f during a separation process. The series of holes may have curves or arbitrary shapes, and embodiments described herein are not limited to the number or geometric shape of the glass panels illustrated in FIG. 1.

Figure 2:
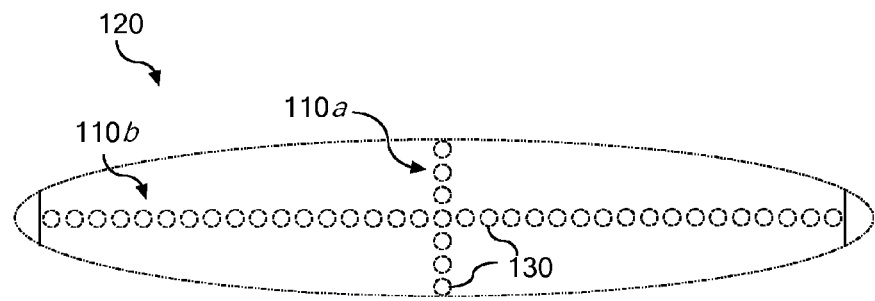
FIG. 2 schematically depicts a close-up top view of two intersecting series of holes of the glass substrate sheet schematically depicted in FIG. 1 according to one or more embodiments described and illustrated herein.
Figure 3:
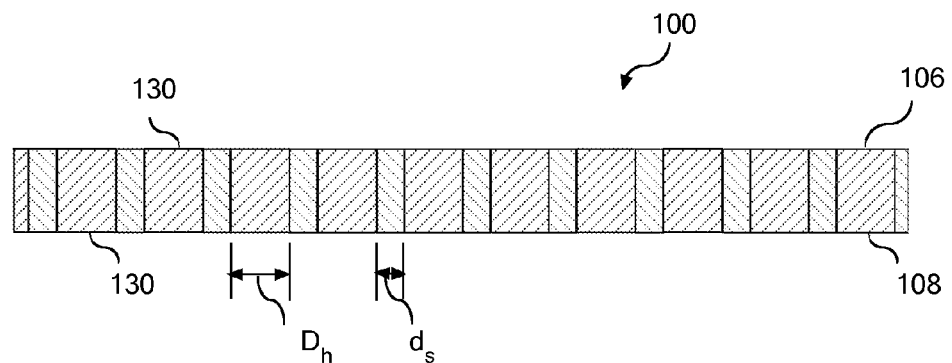
FIG. 3 schematically depicts a partial cross-sectional view of the glass substrate sheet schematically depicted in FIG. 1 according to one or more embodiments described and illustrated herein.

Referring now to FIG. 2, which is a close-up view of region 120 indicated in FIG. 1, each series of holes (e.g., series of holes 110a and 110b) comprises a plurality of holes that fully extend through a thickness of the glass substrate sheet 100. FIG. 3 illustrates a partial cross-section view of the glass substrate sheet 100 illustrated in FIG. 1. It is noted that the holes 130 depicted in the figures are not to scale and are provided for illustrative purposes only. In the embodiment illustrated in FIGS. 1 and 2, the holes 130 are substantially cylindrical throughout the thickness of the glass substrate sheet 100. In another embodiment, the holes 130 may be conical or frustoconical in configuration.

The holes 130 may take on other configurations, and may or may not be uniformly-shaped depending on the process used to create the holes 130 through the glass substrate sheet 100. For example, in yet another embodiment (not shown), the holes may be formed such that the sidewalls of the holes taper from the first surface of the glass substrate sheet to a mid-plane of the glass substrate sheet (i.e., a plane through the glass substrate sheet between the first surface of the glass substrate sheet and a second surface of the glass substrate sheet) and expand from a mid-plane of the glass substrate sheet to the second surface of the glass substrate sheet (i.e., the holes have the general shape of an hour glass through the thickness of the glass substrate sheet). In this embodiment, the holes may have a first diameter at the first surface of the glass substrate sheet, a second diameter at the second surface of the glass substrate sheet, and a third diameter at a mid-plane of the glass substrate sheet such that the first diameter and the second diameter are greater than the third diameter. In one embodiment, the first diameter and the second diameter may be equal.

While specific reference has been made herein to holes with different cross-sectional geometries through the thickness of the glass substrate sheet, it should be understood that the holes may take on a variety of other cross-sectional geometries and, as such, the embodiments described herein are not limited to any particular cross-sectional geometry of the holes.

The size of the holes 130, which may or may not be consistent throughout the series of holes 110a-110f, may depend on the thickness of the glass substrate sheet 100, the composition of the glass substrate sheet 100, the method used to fabricate the holes, and the size and configuration of the glass panels 112a-112l to be separated. Referring to FIG. 3, in one embodiment the holes 130 may have a diameter D$_h$ within a range of about 50 μm to about 1 mm. The holes 130 are separated by a spacing distance d$_s$ that also may depend on the thickness of the glass substrate sheet 100, the composition of the glass substrate sheet 100, the method used to fabricate the holes, and size and configuration of the glass panels 112 to be separated. Smaller spacing distance d$_s$ between holes 130 may result in greater edge strength because the smaller the spacing distance d$_s$, the greater the area within the bulk of the glass substrate sheet that is exposed to the strengthening process. In one embodiment, the spacing distance d$_s$ is within a range of about 100 μm to about 1 mm.

FIG. 4 depicts a partial internal view of a glass substrate sheet 100 along a series of holes that illustrates layers of compressive stress within the glass substrate sheet 100 between the holes 130. As described in more detail below, the glass substrate sheet 100 is subjected to a strengthening process after the formation of the series of holes to form layers of compressive stress therein. A first layer of compressive stress 160 extends from the first surface 106 to a first depth of layer d$_1$, and a second layer of compressive stress 162 extends from the second surface 108 to a second depth of layer d$_2$. Located circumferentially around each hole 130 and between the first and second layers of compressive stress 160, 162 are radially-extending compressive stress regions 164 extending from a wall of each hole 130 to a radius R (i.e., a hole depth of layer ($d_h$)). The radially-extending compressive stress regions 164 are also referred to as edge strengthening compressive layer(s) because the compressive layers within the glass substrate sheet along the series of holes 110 provides a compressive layer or layers along the edges of the separated glass panels 112 after the separation process.

The compressive forces of the layers of compressive stress 160, 162 and 164 are balanced by tensile forces of a central region(s) 165 located between the layers of compressive stress 160, 162 and 164. In regions of the glass substrate sheet 100 outside of the series of holes 100, the center region 165 under tension is located between the first and second depth of layers 160, 162. In one embodiment described herein, the compressive stress may be from about 200 MPa to about 1000 MPa. In another embodiment, the compressive stress may be from about 500 MPa to about 800 MPa. In yet another embodiment, the compressive stress may be from about 650 MPa to about 900 MPa. In the embodiments described herein, the first depth of layer $d_1$, the second depth of layer $d_2$, and the radius R of the hole depth of layers $d_h$ are substantially equal. In one embodiment, the first, second, and hole depth of layers may each be from about 5 microns to about 100 microns. In another embodiment, the first, second, and hole depth of layers may each be from about 30 microns to about 60 microns. In yet another embodiment, the first, second, and hole depth of layers may each be from about 40 microns to about 60 microns. However, it should be understood that, in alternative embodiments, the first depth of layer $d_1$, the second depth of layer $d_2$, and the radius R of the hole depth of layers $d_h$ may not be equal.

As stated above, any number of pre-separated glass panels of various shapes and size may be defined by the one or more series of holes. Further, the series of holes may be formed to separate the glass substrate sheet into one or more smaller pieces that are then cut into glass panels of the desired shape and size. For example, a single series of holes may be formed within the glass substrate sheet to separate the glass substrate sheet into two pieces along the series of holes. It should be understood that the glass substrate sheet may be separated into any number of pieces.

Methods of fabricating glass substrate sheets, fabricating glass panels, and separating glass panels from glass substrate sheets will now be described. Referring to FIG. 5A, the glass substrate sheet 100 is initially provided in un-strengthened condition (i.e., prior to being subjected to a strengthening process) before the series of holes 110 are formed through the thickness of the glass substrate sheet 100. Thereafter, the holes 130 of the series of holes 110 are formed in the un-strengthened glass substrate sheet 100 to define the pre-separated glass panels 112 therein.

In one embodiment, the glass substrate sheet 100 may be annealed prior to forming the holes 130. Annealing the glass substrate sheet 100 may reduce or eliminate residual stresses present in the glass substrate sheet 100, which may lead to scratching, cracking or chipping of the glass substrate sheet 100 during formation of the holes 130 when the residual stresses are present in the glass substrate sheet 100 during formation of the holes 130. In embodiments where the glass substrate sheet 100 is annealed, the annealing process may comprise heating the glass substrate sheet to the annealing point of the glass composition. However, it should be understood that the annealing step is optional and that, in some embodiments, holes may be formed in the glass substrate sheet without first undergoing an annealing step.

In another embodiment, an optional protective coating may be applied to the surfaces of the glass substrate sheet 100 to further reduce or eliminate cracking or chipping of the glass substrate sheet 100 during formation of the holes. The optional protective coating may be applied to the glass substrate sheet 100 to protect the un-strengthened glass in addition to or without the annealing step. The protective coating may be an acrylic coating typically applied to liquid crystal display glass panels. The protective coating may then be removed prior to the strengthening process.

Referring to FIG. 5B, the series of holes 110 are formed through the glass substrate sheet 100. Individual holes 130 of the series of holes 110 may be formed in the un-strengthened glass substrate sheet 100 using one or more of a variety of through-hole forming techniques. For example, the holes 130 may be formed by mechanical drilling, chemical etching, laser ablation, laser assistive processes, abrasive blasting, water jet machining, focused electro-thermal energy or any other suitable technique.

The holes 130 may be formed by a laser drilling process comprising the application of an ultra-short pulsed laser beam. In one particular embodiment, the holes 130 are formed using a laser ablation technique as described in U.S. Pat. No. 6,990,285 entitled "Method of Making At Least One Hole In A Transparent Body And Devices Made By This Method" and assigned to Corning, Inc., the entirety of which is herein incorporated by reference. For example, a femtosecond laser may produce ultra-short laser beam pulses that are in the infrared or near-infrared spectral range and operated at a power such that the pulsed beam ablates the glass material. The wavelength of the laser beam should be within the transparency range of the glass substrate sheet 100. Focusing lenses (not shown) may be utilized to shape the pulsed laser beam such that the holes 130 are formed in a desired geometric configuration (e.g., size and shape). As an example and not a limitation, a femtosecond laser may be operated to produce a 15 ps pulsed laser beam having about a 1064 nm wavelength and about 6.4 W power at a frequency of about 500 kHz. The pulsed laser beam may be focused and translated onto a surface of the glass substrate sheet 100 by a galvo-scanner and an f-theta lens to create the holes 130. It should be understood that the pulsed laser beam may have different properties (e.g., pulse width, wavelength, power, duty cycle, etc.) than those described in the previous example, and that the laser beam may be focused by other focusing and scanning components.

As stated above, the holes 130 may be formed by mechanical drilling processes. In one embodiment, a mechanical diamond drill may be used to drill holes in the glass substrate sheet 100 via a diamond drilling process. Other mechanical drilling techniques may also be utilized to mechanically drill the holes 130.

Regarding the etching process that may be used to form the holes 130, a mask (not shown) may be applied to one or both surfaces of the glass substrate sheet 100, wherein the mask is patterned with openings that correspond with the desired series of holes 110. The glass substrate sheet and the masks may be exposed to an etching solution (e.g., a 5% HF/5% HCl acid solution or a similar acid solution) such that glass material is removed from the openings in the masks to form the holes 130.

Optional strengthening-preparation processes may be performed after the series of holes 110 have been formed within the glass substrate sheet and before the strengthening process. In one embodiment, an optional etching process is performed to minimize the size and sharpness of surface flaws within the holes resulting from the hole-forming processes. Removing these defects by etching may reduce the number of crack initiation locations within the glass substrate sheet 100 and may improve the strength of the glass substrate sheet 100. In one embodiment, the glass substrate sheet may be chemically etched in a solution of 5% HF/5% HCl for about 8-16 minutes to remove defects from the surface of the glass substrate sheet and from the walls of the holes. Other chemical etching solutions may be utilized. It should be understood that the chemical etching step after formation of the series of holes is optional and that, in some embodiments, the glass substrate sheet is not chemically etched after formation of the series of holes.

In one embodiment, the glass substrate sheet 100 may be optionally annealed after formation of the series of holes 110. In this embodiment, the annealing step may be utilized to reduce stresses that may develop in the glass substrate sheet 100 during formation of the holes 130. For example, where laser-assisted processing is used to form the series of holes 110, thermal stresses may remain in the glass substrate sheet after formation of the holes. The annealing step may be utilized to relieve these residual stresses such that the glass substrate sheet 100 is substantially stress-free. However, it should be understood that an annealing step performed after formation of the series of holes is optional and that, in some embodiments, the glass substrate sheet is not annealed after formation of the series of holes.

After the series of holes 110 have been formed in the glass substrate sheet 100, the glass substrate sheet is strengthened by a strengthening process. In one embodiment, the glass substrate sheet is chemically strengthened by an ion exchange process in which smaller metal ions in the glass are replaced or exchanged with larger metal ions of the same valence within a layer of the glass that is close to the outer surface of the glass. The replacement of smaller ions with larger ions creates a compressive stress within the surface of the glass substrate sheet which extends to the depth of layer (DOL).

Referring to FIG. 5C, in one embodiment, the metal ions are monovalent alkali metal ions (e.g., $Na^+$, $K^+$, $Rb^+$, and the like), and ion exchange is accomplished by immersing the glass substrate sheet 100 in a bath 140 comprising at least one molten salt (e.g., $KNO_3$, $K_2SO_4$, KCl, or the like) of the larger metal ion that is to replace the smaller metal ion in the glass. Alternatively, other monovalent cations such as $Ag^+$, $Tl^+$, $Cu^+$, and the like can be exchanged for the alkali metal cations in the glass material. The ion exchange process or processes that are used to strengthen the glass substrate sheets can include, but are not limited to, immersion of the glass in a single bath or immersion of the glass in multiple baths of like or different compositions with washing and/or annealing steps between immersions.

By way of example, in the embodiments described herein where the glass substrate sheet 100 is formed of GORILLA® glass, the glass substrate sheet may be ion exchange strengthened by immersing the glass substrate sheet in a 100% $KNO_3$ molten salt bath having a temperature of 410° C. When the glass substrate sheet is immersed in the salt bath, $Na^+$ ions in the un-strengthened glass substrate sheet are exchanged with $K^+$ ions thereby introducing compressive stress in the glass substrate sheet. The magnitude and the DOL of the compressive stress introduced in the glass substrate sheet generally depend on the length of time the glass substrate sheet is immersed in the salt bath. For example, immersing a glass substrate sheet formed from 0.7 mm thick GORILLA® glass in a $KNO_3$ salt bath at a temperature of 410° C. for 7 hours produces a compressive stress of approximately 720 MPa and a DOL of approximately 50 microns.

While reference has been made herein to a specific ion exchange strengthening process used in conjunction with a specific glass composition, it should be understood that other ion exchange processes and strengthening processes may also be used. Moreover, it should be understood that the ion exchange process utilized to strengthen the glass substrate sheets may vary depending on the specific composition of the glass substrate sheet.

Referring once again to FIG. 4, chemically strengthening the glass substrate sheet 100 induces the first layer of compressive stress 160, the second layer of compressive stress 162, the radially-extending compressive stress regions 164 (i.e., edge compressive layers) at each hole, and central region 165 under tensile stress, as described above. The holes 130 enable regions within the bulk of the glass substrate sheet 100 to be exposed to the ion exchange bath and thus become strengthened by the ion exchange process.

The radially-extending compressive stress regions 164 extend from the sidewall of the hole 130 into the glass substrate sheet. For example, each radially-extending compressive stress region 164 forms around and directly adjacent to the sidewall of a corresponding hole such that the hole is surrounded by a cylinder of compressive stress which extends from the first surface 106 of the glass substrate sheet to the second surface 108 of the glass substrate sheet. In the embodiments described herein, each radially-extending compressive stress region 164 extends from the first layer of compressive stress 160 to the second layer of compressive stress 162 such that a cylinder (or other shape corresponding to the shape of the hole 130) of glass surrounding the hole is under compression through the thickness of the glass substrate sheet 100. Each radially-extending compressive stress region 164 of compressive stress has a radial thickness R (i.e., a hole depth of layer).

As described in more detail below, the series of holes 110 and the associated radially-extending compressive stress regions 164 associated with each hole 130 are formed to increase the edge strength of the glass panels that are separated from the strengthened glass substrate sheet 100. Accordingly, the radially-extending compressive stress regions 164 induced around the holes act as edge strengthening layers that improve the overall strength of the separated glass panels 112.

In one embodiment, after the drilled glass substrate sheet has been strengthened, various film layers may be optionally applied to the glass substrate sheet 100 prior to separation. FIG. 5D illustrates a glass substrate sheet with one or more film layers 170 applied thereto. Application of the film layers 170 onto the glass substrate sheet 100 prior to separation of the glass panels 112 may reduce manufacturing costs. For example, thin film layers 170, such as a touch sensor film layers, may be deposited onto the glass substrate sheet 100 to fabricate a strengthened touch panel. As a non-limiting example, one or more layers of an electrically-conductive and optically-transparent material may be applied to the glass substrate sheet 100 in a predetermined pattern by first applying a masking agent to the glass substrate sheet 100 to define the pattern. Thereafter, the electrically-conductive and optically-transparent thin film coating material is applied to the glass substrate sheet 100 in the unmasked areas. The electrically-conductive and optically-transparent material is applied to the glass substrate sheet 100 to define a plurality of touch-activated areas on the pre-separated glass panels 112. However, it should be understood that the pattern of the electrically-conductive and optically-transparent material may be varied depending on the specific needs of the application in which the glass panel 112 is to be utilized. The electrically-conductive and optically-transparent material may be any material suitable for imparting touch screen functionality to the glass panels 112 of the glass substrate sheet 100 including, without limitation, indium tin oxide, aluminum zinc oxide, conductive polymers, or similar conductive materials. The electrically-conductive and optically-transparent material may be applied to the glass substrate sheet 100 by electron beam deposition, sputtering, physical vapor deposition, spin coating or similar deposition techniques. It should be understood that materials other than electrically-conductive and optically transparent thin film may be utilized to form the one or more touch sensor layers.

Referring now to FIG. 5E, the glass panels 112a-112l are separated from the strengthened glass substrate sheet 100 along the series of holes 110a-110f, as illustrated in FIG. 1, utilizing one or more of a variety of glass separation techniques including, without limitation, mechanical scoring and breaking techniques, laser scribing and breaking techniques, laser through cutting, water jet cutting, etching, abrading the glass substrate sheet, and similar glass separation techniques. FIG. 5E depicts a plurality of glass panels 112a-112l separated from a glass substrate sheet. While the embodiment shown in FIG. 5E depicts glass panels having straight edges and sharp corners, it should be understood that curved features may be formed in the edge glass panel 112. For example, the corners of the separated glass panels may be curved. In one embodiment, the maximum radius of curvature of a curved feature is less than about 10 mm In another embodiment, the maximum radius of curvature of the curved feature is 5 mm or less or even 2 mm or less. However, it should be understood that curved features having a maximum radius of greater than or equal to 10 mm may also be formed in the glass panels.

Each of the separated glass panels 112a-112l has edges that are fully or partially strengthened by the strengthening process. As described above, the glass substrate sheet 100 is chemically strengthened within the regions defined by the series of holes 110 such that edge strengthening layers are formed along the edges of the glass panels 112a-112l. It is noted that edges of glass panels that are defined by the edges of the glass substrate sheet may be fully strengthened, while edges of the glass panels that are defined by the series of holes may be at least partially strengthened.

Figure 6A:
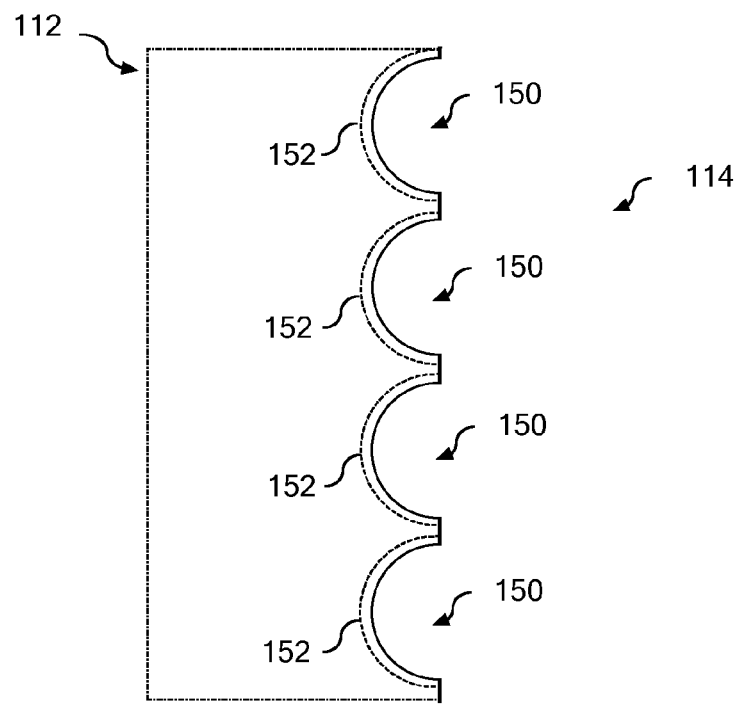
FIG. 6A schematically depicts a partial top view of an edge of a separated glass panel according to one or more embodiments described and illustrated herein.

FIG. 6A depicts a partial view of an edge 114 of a separated glass panel 112. As shown in FIG. 6A, the edge 114 has a scalloped geometry having a plurality of recesses 150 or scalloped regions due to the separation of the glass panel 112 along the series of holes. The geometry of the recesses 150 is dictated by the size and shape of the holes that make up the series of holes along which the glass panels are separated. Because the drilled holes expose regions within the glass substrate sheet to the ion exchange process, the edge 114 of the separated glass panels 112 is at least partially strengthened by edge compressive regions 152. In the embodiment depicted in FIG. 6A, the edge compressive layer comprises discontinuous edge compressive regions 152 about each of the recesses 150 along the edge 114. The edge compressive regions 152 extend through the thickness of the glass panel 112 due to the strengthening process and result from the radially-extending compressive stress regions about the holes 130 prior to glass substrate sheet separation. However, in some embodiments, the edge compressive layer may be continuous along the edge 114 such that the edge is fully strengthened. A continuous edge compressive layer may be achieved by closely spacing the holes along the series of holes and exposing the glass substrate sheet 100 to the ion exchange bath for a duration sufficient enough to achieve a DOL such that the edge compressive regions 152 contact one another and form a fully strengthened edge 114.

Figure 6B:
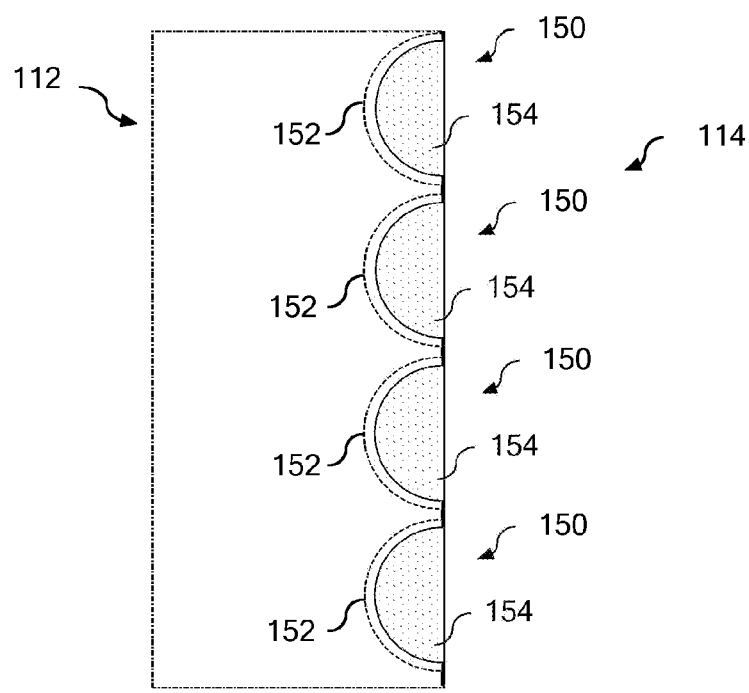
FIG. 6B schematically depicts a partial top view of an edge of a separated glass panel having an edge-finishing material applied thereto according to one or more embodiments described and illustrated herein.

After separation, the edges of the glass substrate panels may be processed to provide a straight edge (rather than a scalloped edge). FIG. 6B depicts a partial view of an edge 114 of a separated glass panel 112 wherein the recesses have been filled with an edge-finishing material 154 to eliminate any sharp features of the edge 114 resulting from separation along the series of holes. For example, the recesses 150 may be metallized or filled with an electrically-conductive material 154, such as a metallic material, to provide a series of metal pads along the edge 114. The metal pads may be used as electrical contacts providing electrical connection to and from the glass panel (e.g., as a touch panel thin film layer in an electronic device). Suitable materials for metallizing the recesses 150 may include, without limitation, copper and copper alloys, gold and gold alloys, silver and silver alloys, platinum and platinum alloys or aluminum and aluminum alloys. In an alternative embodiment, the recesses 150 may be filled with other filler materials including, without limitation, polymeric materials, frit materials and the like to serve other functionalities, such as insulating the panel or providing protection to the edges of the panel.

EXAMPLES

Embodiments described herein will be further clarified by the following examples.

In each of the following Examples, the separated glass panels were subjected to horizontal and vertical bend tests to evaluate the strength of the edges. Each set of samples consisted of 10 samples and the average failure stress for the set of 10 samples was determined by averaging the failure stress for each individual sample in the set.

Example 1

Ten sets of 50 mm×50 mm glass substrate sheets were formed from Corning Code 2317 GORILLA® alkali aluminosilicate glass. Each glass substrate sheet had a thickness of 0.7 mm In this example, two straight series of holes were laser-drilled from a first edge to a second edge of the each glass substrate sheets. Each series of holes was separated from an edge by a distance of about 9.525 mm (⅜ inch) and were separated from each other by about 31.75 mm (1.25 inches). A femtosecond laser with 15 ps pulses (1064 nm wavelength, 6.4 W power, 500 kHz frequency) along with a galvo-scanner and a f-theta lens (f=130 mm) were used to laser drill 0.4 mm diameter holes with a spacing of 0.7 mm between each hole (measured from the center of each hole). The samples were acid etched for 15 minutes in a 5%/HF/5% HCl acid mixture to remove surface flaws, and then ion exchanged at 410° C. for 7 hours in a 100% $KNO_3$ bath. After the ion exchange process, the glass substrate sheets were laser-scored along the series of holes using a femtosecond laser (Ti sapphire: 800 nm wavelength, 50 fs pulse width, 750 W power, 1 kHz frequency) and then mechanically bent to separate the glass substrate sheets along the series of holes. Strength testing via horizontal and vertical bend tests was performed on the separated samples.

Figure 7A:
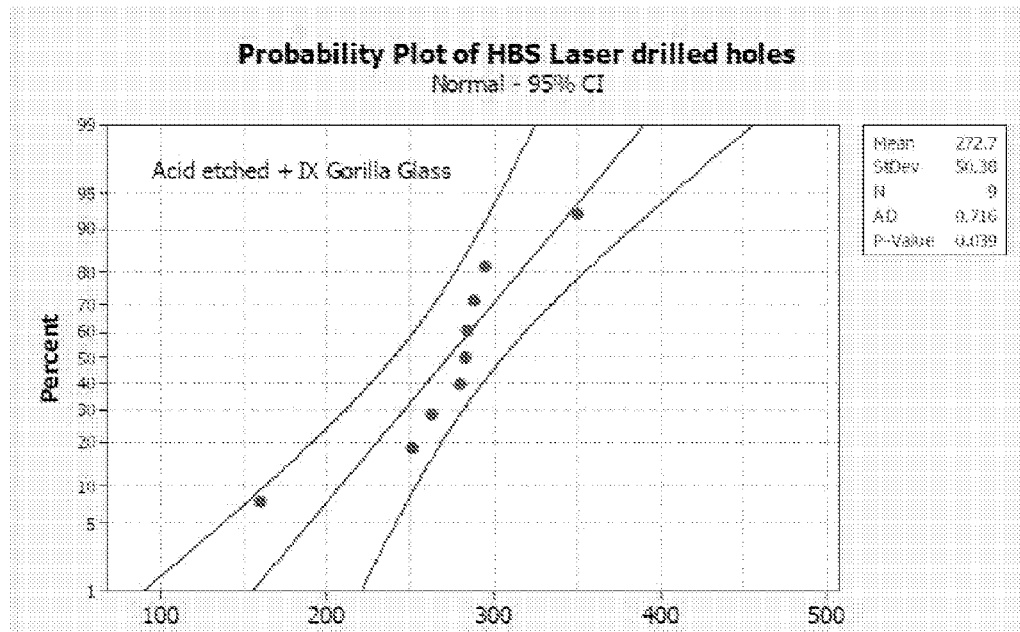
FIG. 7A graphically depicts a probability plot of horizontal bend strengths for glass panels separated from a strengthened glass substrate sheet having laser-drilled holes according to one or more embodiments described and illustrated herein.
Figure 7B:
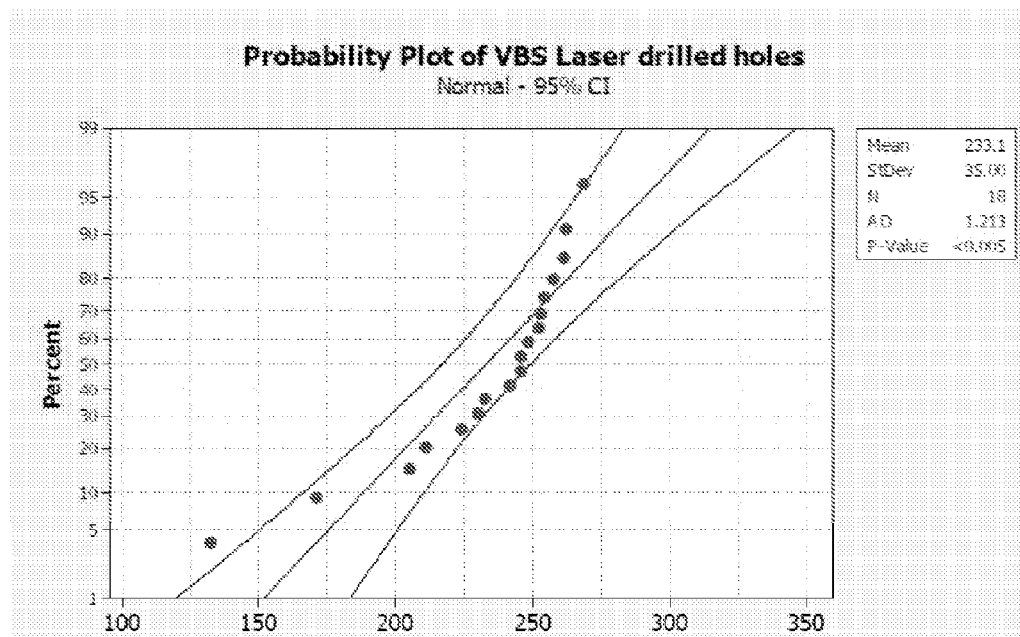
FIG. 7B graphically depicts a probability plot of vertical bend strengths for glass panels separated from a strengthened glass substrate sheet having laser-drilled holes according to one or more embodiments described and illustrated herein.

The horizontal and vertical bend test results are graphically illustrated by Weibull plots in FIGS. 7A and 7B, respectively. The failure stress is indicated by the x-axis and the probability of failure is indicated by the 7-axis. The mean strengths for horizontal bend strength and vertical bend strength were 273

MPa and 233 MPa, respectively. For comparison, the horizontal bend strength for non-ion exchanged edges is generally within about 70 MPa to about 140 MPa, and generally within about 600 MPa to about 800 MPa for fully ion exchanged edges. The vertical bend strength for non-ion exchanged edges is generally with a range of about 20 MPa to about 70 MPa, and generally within a range of about 200 MPa to about 400 MPa for fully ion exchanged edges. Accordingly, the mean horizontal and vertical bend strengths of the partially strengthened edges of the Example 1 samples are greater than non-ion exchanged edges.

Example 2

Ten sets of 50 mm×50 mm glass substrate sheets were formed from Corning Code 2317 GORILLA® alkali aluminosilicate glass. Each glass substrate sheet had a thickness of 0.7 mm In this second Example, two straight series of holes were mechanically drilled with a diamond drill from a first edge to a second edge of the each glass substrate sheets. Each series of holes was separated from an edge by a distance of about 9.525 mm (⅜ inch) and were separated from each other by about 31.75 mm (1.25 inches). The diamond drill was used to mechanically drill 0.26 mm diameter holes with a spacing of 1.0 mm between each hole (measured from the center of each hole). The samples were acid etched for 15 minutes in a 5%/HF/5% HCl acid mixture to remove surface flaws, and then ion exchanged at 410° C. for 7 hours in a 100% KNO₃ bath as described above regarding Example 1. After the ion exchange process, the glass substrate sheets were laser-scored along the series of holes using a femtosecond laser (Ti sapphire: 800 nm wavelength, 50 fs pulse width, 750 W power, 1 kHz frequency) and then mechanically bent to separate the glass substrate sheets along the series of holes. Strength testing via horizontal and vertical bend tests was performed on the separated samples.

The mean strengths for horizontal bend strength and vertical bend strength were 329 MPa ±80 MPa and 111 MPa ±52 MPa, respectively. Similar to the results of Example 1, the mean horizontal and vertical bend strengths of the partially strengthened edges of the Example 2 samples are greater than non-ion exchanged edges.

While Examples 1 and 2 describe glass sheets which are chemically etched prior to ion exchange strengthening, it should be understood that, in alternative embodiments, the glass substrate sheets may be ion exchange strengthened without being chemically etched prior to ion exchange strengthening.

Based on the foregoing, it should be understood that the methods described herein may be used to fabricate glass panels with partially strengthened edges that have higher mechanical strength than non-strengthened edges. The methods described herein enable full-sheet processing for the manufacture of touch panels directly on the strengthened glass substrate sheet. Moreover, the pre-drilled strengthened glass substrate sheets described herein are mechanically stable such that they may be handled and transported for further processing, such as separation into strengthened glass panels.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of fabricating a glass panel haying edges defined by a perimeter from a glass substrate sheet of defined thickness, the method comprising:
    forming at least one series of holes through the thickness of the glass substrate sheet, wherein the at least one series of holes are located along and define at least a portion of the perimeter of the glass panel to be separated from the glass substrate sheet;
    strengthening the glass substrate sheet by an ion-exchange strengthening process; and
    separating the glass panel from the glass substrate sheet along the perimeter, wherein at least a portion of one or more edges of the glass panel comprise an edge compressive layer.

2. The method of claim 1, wherein the at least one series of holes defines the perimeter of a plurality of strengthened glass panels to be separated from the glass substrate sheet.

3. The method of claim 1, wherein:
    the ion exchange strengthening process creates a first strengthened surface layer of a first surface of the glass substrate sheet and a second strengthened surface layer of a second surface of the glass substrate sheet, the first strengthened surface layer and the second strengthened surface layer under a compressive stress and extending from the first surface and the second surface to a depth of layer, and a central region between the first strengthened surface layer and the second strengthened surface layer that is under tensile stress; and
    the ion exchange strengthening process creates the edge compressive layer at each individual hole of the at least one series of holes, the edge compressive layer positioned between the first strengthened surface layer and the second strengthened surface layer and radially extending from a wall of each individual hole to a depth of layer prior to separation of the glass panel from the glass substrate sheet.

4. The method of claim 1, further comprising:
    applying a protective coating to a surface of the glass substrate sheet prior to forming the at least one series of holes; and removing the protective coating from the surface of the glass substrate sheet after forming the at least one series of holes and prior to strengthening the glass substrate sheet.

5. The method of claim 1, further comprising subjecting the glass substrate sheet to an etching solution after forming the at least one series of holes and prior to separating the glass panel from the glass substrate sheet.

6. The method of claim 1, wherein:
    individual holes of the at least one series of holes comprise a diameter within a range of about 50 µm to about 1 mm; and
    a spacing between adjacent individual holes of the at least one series of holes is about 100 µm to about 1 mm.

7. The method of claim 1, further comprising applying an edge-finishing material to at least one edge of the glass panel.

8. The method of claim 7, wherein the edge-finishing material comprises a polymeric material, an electrically-conductive material, or a frit material.

9. The method of claim 1, wherein the at least one series of holes is formed by a laser drilling process.

10. The method of claim 9, wherein the laser drilling process comprises focusing a pulsed laser beam having about 15 ps pulses onto a surface of the glass substrate sheet.

11. The method of claim 1, wherein the at least one series of holes is formed by a diamond drilling process.

12. The method of claim 1, wherein the at least one series of holes is formed by:
- applying a first mask to a first surface of the glass substrate sheet and applying a second mask to a second surface of the glass substrate sheet, the first mask and the second mask having a pattern corresponding to the at least one series of holes;
- subjecting the first mask, the second mask, and the glass substrate sheet to an etching solution until the at least one series of holes are formed;
- removing the first mask, the second mask, and the glass substrate sheet from the etching solution; and
- removing the first mask from the first surface of the glass substrate sheet and the second mask from the second surface of the glass substrate sheet.

13. The method of claim 1, wherein the glass panel has a horizontal bend strength within a range of about 200 MPa to about 1000 MPa, and a vertical bend strength within a range of about 100 MPa to about 600 MPa.

14. A method of fabricating a strengthened glass touch panel having edges defined by a perimeter from a glass substrate sheet of defined thickness, the method comprising:
- forming at least one series of holes through the thickness of the glass substrate sheet, wherein the at least one series of holes are located along and define at least a portion of the perimeter of the strengthened glass touch panel to be separated from the glass substrate sheet;
- strengthening the glass substrate sheet by an ion-exchange strengthening process;
- applying a film layer to a surface of the glass substrate sheet after the ion-exchange strengthening process to form a strengthened glass touch panel, the film layer configured to provide touch-screen functionality to the strengthened glass touch panel;
- separating the strengthened glass touch panel from the glass substrate sheet along the perimeter, wherein at least a portion of one or more edges of the strengthened glass touch panel comprises an edge compressive layer, and the strengthened glass touch panel has a horizontal bend strength within a range of about 200 MPa to about 1000 MPa, and a vertical bend strength within a range of about 100 MPa to about 600 MPa; and
- applying an edge-finishing material to at least one edge of the strengthened glass touch panel.

15. The method of claim 14, wherein:
- the at least one edge comprises a scalloped geometry having a plurality of recesses;
- the edge-finishing material comprises an electrically-conductive material;
- the electrically-conductive material is located within the plurality of recesses, thereby forming one or more electrical contacts along the at least one edge within the plurality of recesses; and
- the film layer is electrically coupled to the one or more electrical contacts.

16. The method of claim 14, wherein:
- the ion-exchange strengthening process creates a first strengthened surface layer of a first surface of the glass substrate sheet and a second strengthened surface layer of a second surface of the glass substrate sheet, the first strengthened surface layer and the second strengthened surface layer under a compressive stress and extending from the first surface and the second surface to a depth of layer, and a central region between the first strengthened surface layer and the second strengthened surface layer that is under tensile stress; and
- the ion-exchange strengthening process creates the edge compressive layer at each individual hole of the at least one series of holes, the edge compressive layer positioned between the first strengthened surface layer and the second strengthened surface layer and radially extending from a wall of each individual hole to a depth of layer prior to separation of the strengthened glass touch panel from the glass substrate sheet.

* * * * *